March 11, 1969     C. D. CUPP     3,431,932
VALVE ASSEMBLY FOR BREATHING APPARATUS
Original Filed Feb. 1, 1963
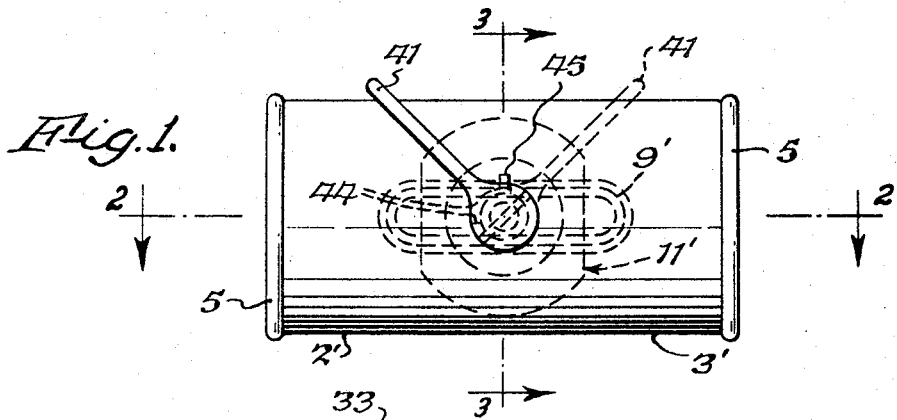
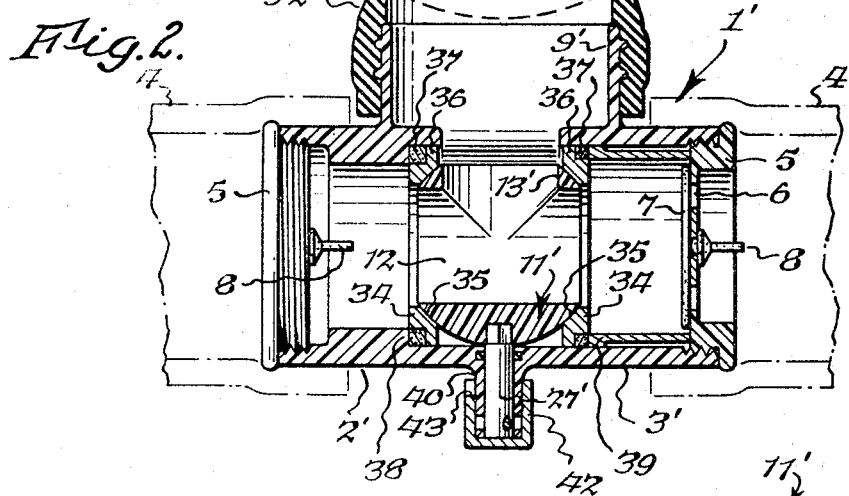
INVENTOR.
Charles D. Cupp
BY
Christel & Bean
ATTORNEYS.

United States Patent Office 3,431,932
Patented Mar. 11, 1969

3,431,932
VALVE ASSEMBLY FOR BREATHING APPARATUS
Charles D. Cupp, Lancaster, N.Y., assignor, by mesne assignments, to Automatic Sprinkler Corporation of America, Cleveland, Ohio, a corporation of Ohio
Original application Feb. 1, 1963, Ser. No. 255,486, now Patent No. 3,256,910, dated June 21, 1966. Divided and this application Aug. 30, 1965, Ser. No. 545,171
U.S. Cl. 137—102   3 Claims
Int. Cl. G05d 7/00; A61m 15/00; F16k 31/60

ABSTRACT OF THE DISCLOSURE

A valve body has opposed inhalation and exhalation passages and a lateral breathing passage. A rotary valve ball having a diametral bore communicating with the inhalation and exhalation passages in one position of the ball and a radial bore communicating with the breathing passage is mounted for rotation about the axis of the radial bore to another position wherein the diametral bore is out of communication with the inhalation and exhalation passages. A pair of opposed annular journal members each having a semispherical bearing surface in sliding engagement with the ball encircle the opposite ends of the diametral bore in the one position of the ball. The journal members seal the diametral bore from the exhalation and inhalation passages in the other rotary position of the ball.

---

This application is a division of my pending application Ser. No. 255,486, filed Feb. 1, 1963, and now Pat. No. 3,256,910 for Valve Assembly for Breathing Apparatus.

This invention relates generally to the valve art, and more specifically to a new and useful valve assembly particularly adapted for use in breathing apparatus.

It is sometimes desired to provide a shutoff valve in the T assembly connected to the mouthbit or face mask, as the case may be, of a breathing apparatus. For example, when used in conjunction with underwater exploration, the user will remove the mouthbit or mask upon surfacing. If the T assembly remains open, there is danger of water passing into the apparatus.

Accordingly, the primary object of my invention is to provide a shutoff valve for breathing apparatus T assemblies and the like, whereby the user can quickly interrupt communication between the breathing passage and the hose connections.

Another object of my invention is to provide the foregoing in a simple, readily assembled, durable, dependable, relatively inexpensive, and lightweight construction.

In one aspect thereof, a breathing apparatus valve assembly constructed in accordance with my invention is characterized by the provision of a valve body having first and second passages, a valve ball having first and second bores communicating with each other and with the first and second body passages when the ball is in one position, and means mounting the ball for rotation in a direction interrupting communication between one of the bores and the passage associated therewith, these last-named means including generally opposite journal members for sliding engagement with the ball, with one of the journal members having an annular bearing surface encircling the one ball in the one position of the ball and sealing the bore from the one passage when the ball is in another rotary position.

The foregoing and others objects, advantages and characterizing features of the valve assembly of my invention will become more clearly apparent from the ensuing detailed description of three illustrative embodiments thereof, considered in conjunction with the accompanying drawings wherein like reference numerals denote like parts throughout, and wherein:

FIG. 1 is a front elevational view of one form of valve assembly of my invention;

FIG. 2 is a view thereof, partly in plan and partly in horizontal section taken about on line 2—2 of FIG. 1;

FIG. 3 is a vertical sectional view thereof taken about on line 3—3 of FIG. 1;

FIG. 4 is a perspective view of the valve ball.

There is provided a housing 1' having inhalation and exhalation passage sections 2' and 3' adapted for connection to hoses 4. Here, breathing section 9' is shown connected to a mouthbit 32 of known type, having the portions 33 adapted to be clamped between the teeth.

The valve ball 11' is provided with a diametral, through bore 12 and with a radial lateral bore 13' communicating with the passages 2', 3' and 9'. The ball is rotated about the axis of bore 13', whereby journal members 34 normally encircle the opposite ends of through bore 12 in the "on" position of the valve. Each journal member 34 is provided with a semispherical, annular bearing surface 35 having sliding, sealing engagement with ball 11'. Each journal member also is provided with an annular, peripheral shoulder 36, receiving an O-ring or other seal 37. One journal member 34 is seated against a shoulder 38 at the inner end of section 2', while a removable sleeve 39 bears against the seal 37 of the other journal member 34, being urged thereagainst by the end cap 5 of section 3' to hold the ball and journals assembled with sufficient friction to retain the ball in adjusted position.

In this instance, the valve stem 27' is journaled in an extension 40 of body 1', and connected to an actuating arm 41 having a sleeve 42 pinned to shaft 27'. Sleeve 42 is cut away, at 43, to provide a pair of stop shoulders 44 abutting a stop 45, carried by body 1', at opposite ends of the path of movement of arm 41 through angle $\alpha$ (FIG. 8).

In the "on" position, bore 12 communicates with sections 2' and 3' through the annular journals 34 which extend around the inner ends of these sections in sealing engagement with ball 11'. In the "off" position, ball 11' is rotated about the axis of bore 13', moving bore 12 out of communication with sections 2', 3', and journals 34 seal the inner ends of these sections against solid surface portions of ball 11'.

Accordingly, it is seen that my invention fully accomplishes its intended objects.

Having fully disclosed and completely described my invention, and its mode of operation, what I claim as new is:

1. A valve assembly for breathing apparatus comprising a valve body having opposed inhalation and exhalation passages and a lateral breathing passage, inhalation and exhalation check valves arranged in said inhalation and exhalation passages to permit only inhalation through the former and only exhalation through the latter, a rotary valve ball having a diametral bore communicating with said inhalation and exhalation passages in one position of said ball and a radial bore communicating with said breathing passage, and means mounting said ball for rotation about the axis of said radial bore to another position wherein said diametral bore is out of communication with said inhalation and exhalation passages, said last-named means including a pair of opposed annular journal members each having a semispherical bearing surface in sliding engagement with said ball, said journal members encircling the opposite ends of said diametral bore in said one position of said ball and sealing said diametral bore from said exhalation and inhalation passages in said other rotary position of said ball.

2. A valve assembly as in claim 1, together with seals carried by said journal members in sealing engagement with said body.

3. A valve assembly as set forth in claim 2, said body including a member clamping said journal members against said ball.

References Cited

UNITED STATES PATENTS

| | | | |
|---|---|---|---|
| 208,808 | 10/1878 | Glenn | 137—625.41 |
| 2,911,009 | 11/1959 | Parker | 251—310 XR |
| 2,845,949 | 8/1958 | Parker | 251—172 XR |
| 3,101,740 | 8/1963 | Ray | 251—174 XR |

FOREIGN PATENTS

| | | |
|---|---|---|
| 292,480 | 8/1919 | Germany. |
| 1,353 | 3/1914 | Great Britain. |
| 759,218 | 10/1956 | Great Britain. |

WILLIAM F. O'DEA, *Primary Examiner.*

RICHARD GERARD, *Assistant Examiner.*